(12) United States Patent
Huang

(10) Patent No.: US 9,701,797 B2
(45) Date of Patent: Jul. 11, 2017

(54) SELF-HEALING CARBON FIBER COMPOSITES

(71) Applicant: GM Global Technology Operations LLC, Detroit, MI (US)

(72) Inventor: Xiaosong Huang, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 28 days.

(21) Appl. No.: 14/885,534

(22) Filed: Oct. 16, 2015

(65) Prior Publication Data

US 2017/0107338 A1   Apr. 20, 2017

(51) Int. Cl.
| | |
|---|---|
| C08F 2/46 | (2006.01) |
| C08F 2/50 | (2006.01) |
| C08G 61/04 | (2006.01) |
| C08J 5/06 | (2006.01) |
| C08J 5/04 | (2006.01) |

(52) U.S. Cl.
CPC ............... C08J 5/06 (2013.01); C08J 5/042 (2013.01); *C08J 2300/00* (2013.01)

(58) Field of Classification Search
CPC ........... C08J 5/06; C08J 5/042; C08J 2300/00
USPC ............... 522/75, 74, 71, 189, 184, 1; 520/1
See application file for complete search history.

(56) References Cited

U.S. PATENT DOCUMENTS

| | | | |
|---|---|---|---|
| 7,097,922 B2 | 8/2006 | Shen et al. | |
| 7,462,666 B2 | 12/2008 | Ottaviani et al. | |
| 7,589,143 B2 | 9/2009 | Nazri et al. | |
| 7,655,749 B2 | 2/2010 | Mance et al. | |
| 7,737,211 B2 | 6/2010 | Ottaviani et al. | |
| 7,896,190 B2 | 3/2011 | Berger et al. | |
| 7,939,595 B2 | 5/2011 | Nazri et al. | |
| 7,985,830 B2 | 7/2011 | Mance et al. | |
| 8,297,091 B2 | 10/2012 | Morales | |
| 8,383,200 B2 | 2/2013 | Xiao et al. | |
| 8,496,993 B2 | 7/2013 | Xiao | |
| 9,328,266 B2 | 5/2016 | Vanimisetti et al. | |
| 2009/0214874 A1 | 8/2009 | Voss et al. | |
| 2011/0272238 A1 | 11/2011 | Basu et al. | |
| 2012/0118424 A1 | 5/2012 | Cannon et al. | |
| 2014/0011016 A1 | 1/2014 | Vanimisetti et al. | |
| 2015/0166822 A1* | 6/2015 | Samsudin | C08L 23/0869 523/436 |
| 2015/0291745 A1* | 10/2015 | Mao | B29C 73/22 524/586 |
| 2016/0059451 A1 | 3/2016 | Rousseau | |

FOREIGN PATENT DOCUMENTS

| | | | |
|---|---|---|---|
| WO | 2013-172904 | * | 11/2013 |
| WO | 2014-017899 | * | 1/2014 |
| WO | 2014-081930 | * | 5/2014 |

OTHER PUBLICATIONS

Yuan, C., et al.; "Application of Alkoxyamine in Self-Healing of Epoxy," J. Mater. Chem. A, 2, (Feb. 6, 2014), pp. 6558-6566.

* cited by examiner

*Primary Examiner* — Jessica E Whiteley
(74) *Attorney, Agent, or Firm* — Harness, Dickey & Pierce, P.L.C.

(57) ABSTRACT

Provided is a self-healing carbon fiber composite which may include a polymer matrix, a plurality of carbon fibers dispersed within the polymer matrix, and a self-healing polymer layer bonded onto at least a portion of the carbon fibers. Also provided herein are methods of manufacturing and repairing the carbon fiber composite.

20 Claims, 1 Drawing Sheet

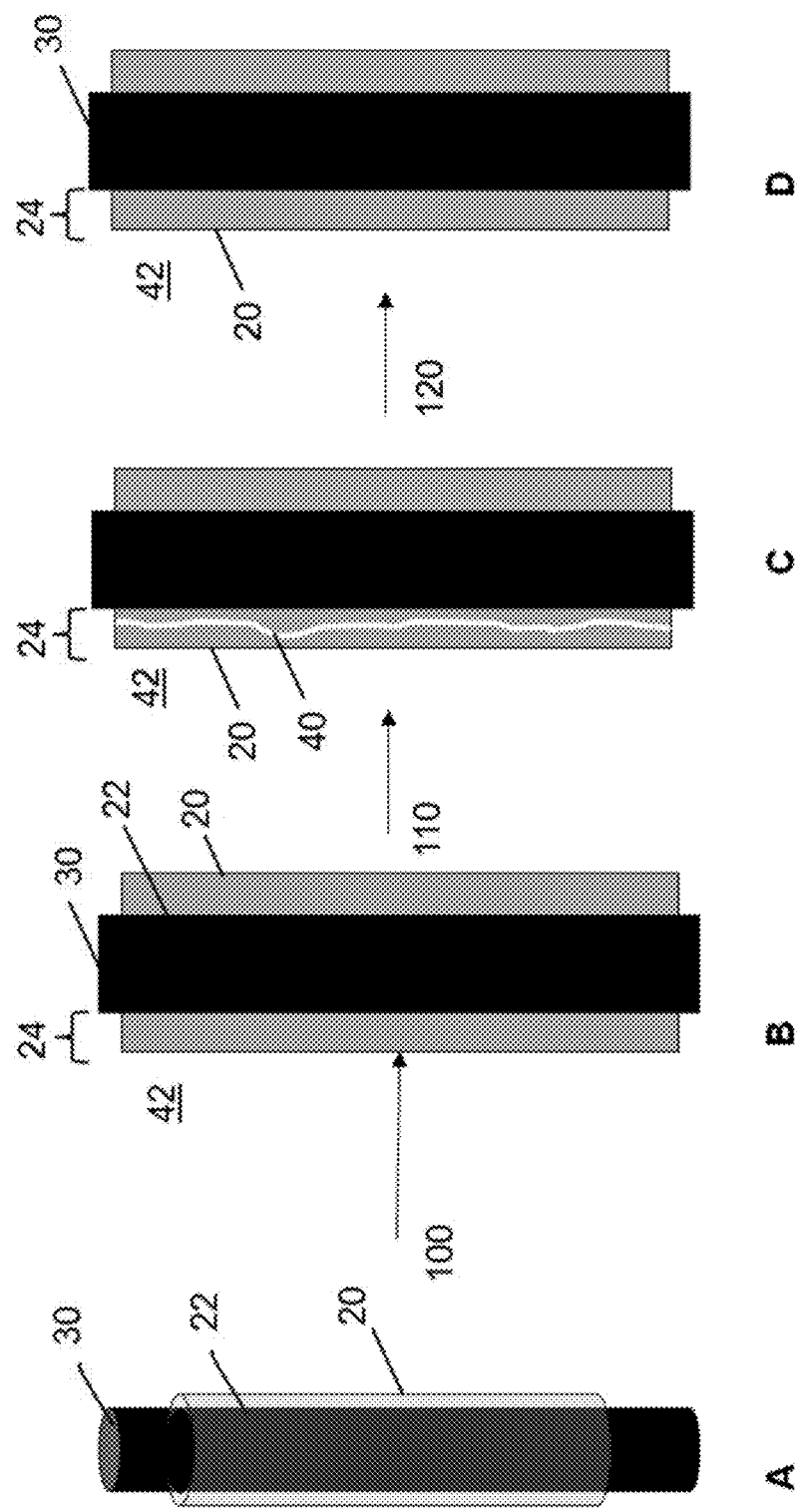

SELF-HEALING CARBON FIBER COMPOSITES

FIELD

The present disclosure relates to carbon fiber composites, particularly carbon fiber composites including a self-healing polymer layer and manufacturing methods thereof.

BACKGROUND

This section provides information helpful in understanding the invention but that is not necessarily prior art.

Composite materials having reinforcement or filler materials dispersed in a polymeric matrix are known to exhibit mechanical properties such as stiffness, strength and toughness, which are superior to the polymer in the polymeric matrix alone. These composite materials may be used in a variety of products and as building materials due to their high strength, durability and the ability to easily manufacture and machine such composites into a variety of shapes and designs. In particular, carbon fiber composites are especially desirable because of their high strength-to-weight ratio. Thus, carbon fiber composites may be incorporated into various products including structural and design components of vehicles and aircrafts.

However, carbon fiber composites are susceptible to damage, which may be caused by various factors (e.g., mechanical, chemical, thermal, etc.). This damage may lead to microcracks within the carbon fiber composite, which can be difficult to detect and repair and over time can potentially result in premature failure of the carbon fiber composite material. Thus, there is a need for carbon fiber composites, which are able to self-heal or self-repair following damaging events to extend the life of carbon fiber composites.

One approach, known as extrinsic self-healing, is to provide a microencapsulated healing agent within the carbon fiber composite material, which upon fracture, is released and rebonds/repairs the cracks in the composite material. However, this approach is limited by the amount of healing agent included in the carbon fiber composite material because once the healing agent is exhausted, no further damage can be repaired. Another approach, known as intrinsic self-healing, incorporates self-healing functional groups into the polymer chains to make the polymeric matrix itself self-healable, where the self-healing groups possess a latent self-healing functionality that is activated by damage or by an external stimulus. However, many self-healable polymers may show inferior mechanical and physical properties resulting in a carbon fiber composite with reduced strength and stability. Thus, there is a need for further self-healing composite materials with increased strength and stability.

SUMMARY

This section provides a general summary of the disclosure, and is not a comprehensive disclosure of its full scope or all of its features.

The present disclosure provides self-healing carbon fiber composites comprising a polymer matrix, a plurality of carbon fibers dispersed within the polymer matrix, and a self-healing polymer layer bonded onto at least a portion of a surface of each of the carbon fibers. The self-healing polymer layer has a bond selected from the group consisting of an ionic bond, a covalent bond, and a hydrogen bond. The self-healing polymer layer is present between the polymer matrix and at least a portion of the plurality of carbon fibers.

In certain aspects, it has been found that introduction of a self-healing material at an interface between a carbon fiber and a polymer matrix can result in a carbon fiber composite with improved strength, durability and service life.

In other aspects, the present disclosure provides methods of repairing the self-healing carbon fiber composites described herein. The self-healing carbon fiber composite further comprises at least one crack in an interface between the polymer matrix and the plurality of carbon fibers. The method comprises subjecting the carbon fiber composite to a healing cycle selected from the group consisting of a temperature cycle, a moisture cycle, a light cycle, and combinations thereof.

In other aspects, the present disclosure provides components for a vehicle comprising the self-healing carbon fiber composites described herein.

In other aspects, the present disclosure provides methods of repairing the component for the vehicle described herein. The self-healing carbon fiber composite further comprises at least one crack in an interface between the polymer matrix and the plurality of carbon fibers. The method comprises subjecting the self-healing carbon fiber composite to a healing cycle selected from the group consisting of a temperature cycle, a moisture cycle, a light cycle, and combinations thereof.

In other aspects, the present disclosure provides methods of manufacturing the self-healing carbon fiber composites described herein. The method comprises coating a plurality of carbon fibers with a self-healing polymer layer. The plurality of carbon fibers is then dispersed in a precursor of a polymer matrix. The method also comprises curing the precursor to form the polymer matrix having the plurality of carbon fibers dispersed therein. The self-healing polymer layer is present between the polymer matrix and the plurality of carbon fibers.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIGS. 1A-1D show an embodiment of a self-healing carbon fiber composite according to certain aspects of the present disclosure.

DETAILED DESCRIPTION

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

In certain aspects, the phrase "at least a portion of" means >0 to 100.0 wt. % of the composition to which the phrase refers. The phrase "at least a portion of" refers to an amount ≤about 1.0 wt. %, ≤about 2.0 wt. %, ≤about 5.0 wt. %, ≤about 10.0 wt. %, ≤about 20.0 wt. %, ≤about 25.0 wt. %, ≤about 30.0 wt. %, ≤about 40.0 wt. %, ≤about 50.0 wt. %, ≤about 60.0 wt. %, ≤about 70.0 wt. %, ≤about 75.0 wt. %, ≤about 80.0 wt. %, ≤about 90.0 wt. %, ≤about 95.0 wt. %, ≤about 98.0 wt. %, ≤about 99.0 wt. %, or ≤about 100.0 wt. %. Additionally or alternatively, the phrase "at least a portion of" refers to an amount ≥about 1.0 wt. %, ≥about 2.0 wt. %, ≥about 5.0 wt. %, ≥about 10.0 wt. %, ≥about 20.0 wt. %, ≥about 25.0 wt. %, ≥about 30.0 wt. %, ≥about 40.0 wt. %, ≥about 50.0 wt. %, ≥about 60.0 wt. %, ≥about 70.0 wt. %, ≥about 75.0 wt. %, ≥about 80.0 wt. %, ≥about 90.0 wt. %, ≥about 95.0 wt. %, ≥about 98.0 wt. %, ≥about 99.0 wt. %, or about 100.0 wt. %. Ranges expressly disclosed include combinations of any of the above-enumerated values, e.g., about 10.0 to about 100.0 wt. %, about 10.0 to about 98.0 wt. %, about 2.0 to about 10.0 wt. %, about 40.0 to 60.0 wt. %, etc.

As used herein, the term "polymer matrix" refers to a polymer composition that forms a continuous phase and/or surrounds one or more reinforcing materials or components, such as carbon fibers.

As used herein, the term "self-healing" refers to self-recovery of at least a portion of mechanical integrity and initial properties of a material after destructive actions of an external or internal stress. Self-healing may also include repairing of cracks within a composite material. Self-healing attributes are further discussed below.

Throughout this disclosure, numerical values represent approximate measures or limits to ranges to encompass minor deviations from the given values and embodiments having about the value mentioned as well as those having exactly the value mentioned. Other than in the working examples provided, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. In addition, disclosure of ranges includes disclosure of all values and further divided ranges within the entire range, including endpoints given for the ranges.

Example embodiments will now be described more fully with reference to the accompanying drawings.

I. Self-Healing Carbon Fiber Composites

In various aspects, a self-healing carbon fiber composite is provided. The carbon fiber composite may comprise a polymer matrix and a plurality of carbon fibers dispersed within the polymer matrix. Further, a self-healing polymer layer 20 may be bonded onto at least a portion of a surface 22 of a carbon fiber 30, as shown in FIGS. 1A and 1B.

A. Carbon Fibers

Suitable carbon fibers may include relatively short length fibers (having lengths of ≥about 0.1 mm to ≤about 10 mm), relatively long length fibers (having lengths of ≥about 10 mm to ≤about 100 mm), or continuous fibers (having lengths of ≥about 100 mm), and may include any combinations thereof. Long length fibers can provide good balance of moldability/productivity/mechanical performance. The carbon fibers may be chopped, as well.

The carbon fibers dispersed within the polymer matrix may be configured in a random-oriented manner, for example, in a substantially two-dimensionally-random oriented or in a specific-direction-oriented manner. Carbon fibers are typically surface functionalized through chemical, electro-chemical, or physical approaches that are well known to those of skill in the art. Carbon nanofibers and carbon nanotubes can be coated with polymers. In certain variations, the carbon fiber may be surface-modified or grafted with a polymer, such as a copolymerized polyolefin attached to a surface of the carbon fibers. The copolymerized polyolefin may contain an aromatic vinyl compound and an acid and/or acid anhydride as copolymerization components, by way of non-limiting example. Additionally or alternatively, the carbon fibers may be surface functionalized, for example, having an oxidized surface to include carboxyl and hydroxyl groups, which may be present as a layer on the carbon fibers.

In various aspects, the carbon fibers may each have an average diameter of at least about 1 µm, at least about 2 µm, at least about 3 µm, at least about 4 µm, at least about 5 µm, at least about 6 µm, at least about 7 µm, at least about 8 µm, at least about 9 µm, at least about 10 µm, at least about 12 µm, at least about 14 µm, at least about 15 µm, at least about 16 µm, at least about 18 µm, or at least about 20 µm. Ranges expressly disclosed include combinations of any of the above-enumerated values, e.g., about 1 µm to about 20 µm, about 2 µm to about 18 µm, about 4 µm to about 16 µm, about 5 µm to about 12 µm, etc. In particular, the carbon fibers may each have an average diameter of about 1 µm to about 20 µm, about 3 µm to about 16 µm, or about 5 µm to about 15 µm.

B. Polymer Matrix

The polymer matrix may be formed from any kind of suitable precursor or resins. For example, thermoset resins are cured from a liquid precursor to form a polymer. For thermoplastic polymer matrix materials, the polymers melt to a liquid state or dissolved in a solvent to form a solution before the fibers are added creating the composites. By way of non-limiting example, the polymer matrix precursors may include: polyester, epoxy, vinyl ester, phenolic resins, bis-maleimides, polyimides, vinyl chloride resin, vinylidene chloride resin, vinyl acetate resin, polyvinyl alcohol resin, polystyrene resin, acrylonitrile styrene resin, acrylonitrile-butadiene-styrene resin, acrylic resin, methacrylate resin, polyethylene resin, polypropylene resin, polyamide resin (PA6, PA11, PA12, PA46, PA66, PA610), polyacetal resin, polycarbonate resin, polyethylene terephthalate resin, polyethylene naphthalate resin, polybutylene terephthalate resin, polyacrylate resin, polyphenylene ether resin, polyphenylene sulfide resin, polysulfone resin, polyether sulfone resin, polyether ether ketone resin, polylactide resin, polyhydroxyether resin, polyphenylenoxide resin, styrene/maleic anhydride (SMA) resin, isoprene/SMA resin, 1,2-polybutadiene resin, silicone resin (e.g., SYLGARD™ 186), or any combination or copolymer of these resins. In certain variations, the polymer matrix may comprise a bisphenol A epoxy resin, a bisphenol A based polyester resin, a urethane modified epoxy resin, a novolac-based epoxy resin, and/or a vinyl ester resin.

C. Self-Healing Polymer Layer

Preferably, the self-healing polymer layer may be present between the polymer matrix and at least a portion of the surface of each respective carbon fiber of the plurality of carbon fibers, i.e., at the interface region or interphase between the polymer matrix and the plurality of carbons fibers, as opposed to only present as the polymer matrix. The interphase between the polymer matrix and the plurality of carbons can have significant impact on the strength and durability of the overall fiber carbon composite. For example, if the interphase is too weak the carbon fibers may be pulled out of the polymer matrix, and if the interphase is too strong the carbon fiber composite becomes too brittle. Damage at the interphase caused by fatigue, stress or impact, over time, can cause microcracks which can lead to macroscopic cracking and ultimately can lead to potential premature failure of the carbon fiber composite. Thus, incorporating a self-healing polymer between the carbon fibers and the polymer matrix (i.e., at the interface) can increase durability and extend service life of the carbon fiber composite.

For example, the self-healing polymer layer 20 defines an interphase region 24 between carbon fiber 30 and polymer matrix 42. When cracks 40 (e.g., microcracks) form in the interphase region 24 (e.g., within the self-healing layer 20) after fatigue or impact of the composite system, incorporation of a self-healing polymer layer 20, as shown in FIGS. 1B-1D, can seal or repair those cracks in the interphase region 24 and serves to extend the life of the carbon fiber composite. Notably, the self-healing polymer layer 20 has a first toughness that is less than or equal to a second toughness of the polymer matrix 42. Designing the self-healing layer 20 to have a first toughness less than the second toughness of the polymer matrix 42 thus ensure that under an impact, the self-healing layer 20 will fail first. Otherwise, if the polymer matrix 42 were to fail first, the polymer matrix would not be able to be recovered and self-healed.

Step 100 in FIG. 1B shows a carbon fiber 30 with the self-healing polymer layer 20 surrounded by a polymer matrix 42. In FIG. 1C at Step 110, damage is inflicted and a crack 40 develops in the self-healing polymer layer 20 in the interphase region 24 between the polymer matrix 42 and the carbon fiber(s) 30. In Step 120, a healing cycle occurs that facilitates healing of the self-healing polymer layer 20 to recover and eliminate or minimize the presence of any cracks. As will be appreciated, the single carbon fiber represented here may in fact be multiple carbon fibers of the plurality of carbon fibers distributed in the carbon fiber composite.

In various aspects, the self-healing polymer layer bonds to the carbon fibers. Such a bond may be selected from the group consisting of an ionic bond, a covalent bond, and a hydrogen bond. For example, the self-healing polymer layer may comprise functional groups that can form hydrogen bonds with the carbon fiber surface. Example of suitable functional groups include but are not limited to hydroxyl, carbonyl and amino groups. In particular, the self-healing polymer layer may be covalently attached to a surface of the carbon fibers and contain functional groups which may chemically react with the polymer matrix.

In certain variations, the self-healing polymer layer may have a thickness of ≥about 10 nm, ≥about 20 nm, ≥about 30 nm, ≥about 50 nm, ≥about 100 nm, ≥about 250 nm, ≥about 500 nm, ≥about 750 nm, ≥about 1000 nm, ≥about 1250 nm, ≥about 1500 nm, ≥about 1750 nm, ≥about 2000 nm, ≥about 2250 nm, ≥about 2500 nm, ≥about 2750 nm, ≥about 3000 nm, ≥about 3250 nm, ≥about 3500 nm, ≥about 3750 nm, ≥about 4000 nm, ≥about 4250 nm or ≥about 4500 nm. Ranges expressly disclosed include combinations of any of the above-enumerated values, e.g., about 10 nm to about 4500 nm, about 30 nm to about 3500 nm, about 50 to about 2750 nm, etc. In particular, the self-healing polymer layer may have thickness of about 10 nm to about 3000 nm.

In various aspects, the self-healing polymer layer may be epoxy based, polyimide based, polycarbonate based, polyester based, polyurethane based, silicone based, polyacrylate based and polyhydroxyether based. Further, the self-healing polymer layer comprises a self-healing material capable of reversible bonding and possessing a latent self-healing functionality activated by damage or an external stimulus. Suitable self-healing materials may comprise thiuram disulfide units, materials capable of Diels-Alder (DA) bonding/rebonding, alkoxyamine moieties, coumarin derivatives, acylhydrazone bonds, disulfide links, materials capable of Ru-catalyzed shuffling of C—C bonds, materials capable of hydrogen bonding, ionomers, materials capable of π-π stacking, and metal (e.g., Zn) ligands (for example, zinc-imidazole). For example, a polymer can reversibly re-establish its broken bonds at a molecular level by thermal activation through DA bonding. Additionally, ionomers (e.g., poly(ethylene-co-methacrylic acid)) can form reversible clusters that act as reversible cross-linkers, which can be activated be external stimuli such as temperature and ultraviolet (UV) light. Preferably, the self-healing polymer layer is compatible with the polymer matrix. In particular, the self-healing polymer layer comprises an alkoxyamine moiety and/or a metal (e.g., Zn) ligand.

A suitable alkoxyamine moiety may comprise the following moiety, as reported by Yuan, C. et al., J. Mater. Chem. A, 2014, 2, 6658-6566, the relevant portions of which are incorporated herein by reference:

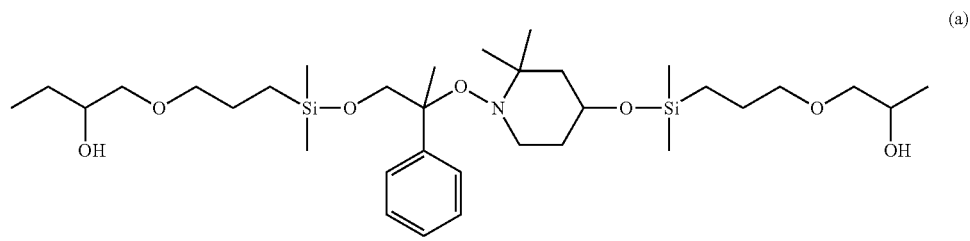 [SMILES: CCC(O)COCCC[Si](C)(C)OCC(C)(ON1CCC(O[Si](C)(C)CCCOCC(C)O)CC1(C)C)c1ccccc1]

(a)

Moiety (a) comprises reversible C—ON bonds, which contribute to self-healing when exposed to heat.

A suitable metal ligand may include the following complex:

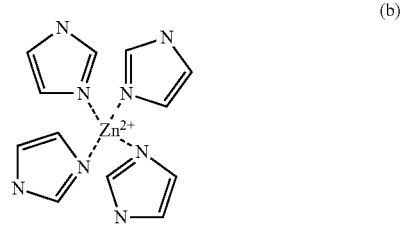

(b)

Additionally, the carbon fibers may comprise a sizing agent. Commercially produced carbon fibers typically have been treated with sizing agents for handling and packaging. In one variation, the self-healing polymer layer may be used as the sizing agent for the carbon fibers and may be added during the carbon fiber manufacturing process. In another variation, the carbon fiber composites may have one or more traditional sizing agents applied to the carbon fiber and later the self-healing polymer is applied on prefabricated carbon fibers that have a sizing layer applied. Accordingly, the sizing agent may be present as a layer between the carbon fiber and the self-healing polymer layer. In such an embodiment, strong interaction between the sizing layer and the self-healing polymer layer is desirable. This strong interaction between the sizing agent and the self-healing polymer layer may be provided by covalent, ionic, or hydrogen bonds and/or polymer chain entanglement. Examples of conventional suitable sizing agents include the polymeric precursors/resins described above as suitable polymer matrix materials. As appreciated by those of skill in the art, the carbon fiber composite material may further include other conventional ingredients, including other reinforcement materials, functional fillers or additive agents, like organic/inorganic fillers, fire-retardants, anti-ultraviolet radiation agents (UV stabilizers), anti-oxidants, colorants, mold release agents, softeners, plasticizing agents, surface active agents, and the like.

Damage inflicted on the composite may propagate through the polymeric matrix, through the self-healing polymer layer, and may damage the carbon fibers. Damage inflicted to carbon fibers cannot be repaired. Because most of the load in a carbon-fiber composite is applied to the fibers, preserving the integrity of the carbon fibers by minimizing crack propagation serves to extend the life of the composite. Thus, in conventional carbon-fiber composites, damage or fatigue causes micro-cracking. The micro-cracks can grow and cause damage to the carbon fiber. In accordance with the present technology, the self-healing process can protect the long carbon fiber/long carbon fiber composites to extend the composite life.

In various aspects, the carbon fiber composite described herein is capable of self-healing and may undergo one or more healing cycles, e.g., 1-30 healing cycles, 1-20 healing cycles, 1-10 healing cycles, by way of non-limiting example. As used herein, "healing cycle" refers to a period or event where at least a portion of damage (e.g., cracks) in the carbon fiber composite are repaired or resealed. Following damage (e.g., cracking) to the carbon fiber composite, the carbon fiber composite is capable of recovering at least a portion of an initial tensile strength of the carbon fiber composite. In particular, the self-healing layer of the carbon fiber composite described herein is capable of recovering at least about 40%, at least about 50%, at least about 60%, at least about 70%, at least about 80%, at least about 90%, at least about 95% or at least about 99% of the tensile strength of the self-healing polymer following damage to the carbon fiber composites. Ranges expressly disclosed include combinations of any of the above-enumerated values, e.g., about 50% to about 99%, about 60% to about 99%, about 70% to about 90%, etc. In particular, in certain variations, the self-healing carbon fiber composite described herein is capable of recovering at least about 60% of self-healing polymer's initial tensile strength following damage to the carbon fiber composite. For example, the self-healing carbon fiber composite may be capable of recovering at least about 60% of the self-healing polymer's initial tensile strength, so that if the self-healing polymer initially has a tensile strength of about 20 MPa, the self-healing carbon fiber composite is capable of recovering at least about 12 MPa (60% of 20 MPa) in tensile strength.

In certain other aspects, the carbon fiber composite is capable of closing at least about 60% of the initial micro-cracks in the self-healing polymer layer or recovering at least about 60% of an initial tensile strength of the self-healing polymer layer following micro-cracking of the carbon fiber composite, optionally recovering at least 70% of the initial micro-cracks in the self-healing polymer layer or recovering at least about 70% of an initial tensile strength of the self-healing polymer layer following micro-cracking, optionally recovering at least 80% of the initial micro-cracks in the self-healing polymer layer or recovering at least about 80% of an initial tensile strength of the self-healing polymer layer following micro-cracking, optionally recovering at least 90% of the initial micro-cracks in the self-healing polymer layer or recovering at least about 90% of an initial tensile strength of the self-healing polymer layer following micro-cracking, In certain aspects, various components of a vehicle may comprise the self-healing carbon fiber composite described herein. Notably, while the self-healing carbon fiber composites are particularly suitable for use in components of an automobile or other vehicles (e.g., motorcycles, boats), but may also be used in a variety of other industries and applications, including aerospace components, consumer goods, office equipment and furniture, industrial equipment and machinery, farm equipment, or heavy machinery, by way of non-limiting example. In vehicles, the components may be hoods, pillars, such as hinge pillars, panels, including structural panels, door panels, and door components, interior floors, floor pans, roofs, exterior surfaces, underbody shields, wheels, storage areas, including glove boxes, console boxes, trunks, trunk floors, truck beds, lamp pockets and other components, shock tower cap, control arms and other suspension, crush cans, bumpers, structural rails and frames, cross car beams, undercarriage or drive train components, and the like, by way of non-limiting example.

II. Methods of Repairing Self-Healing Carbon Fiber Composites

In another embodiment, methods of repairing self-healing carbon fiber composites described herein and vehicle components as described herein are provided. The self-healing carbon fiber composite may be damaged, e.g. have crack(s) (e.g., microcracks) therein, particularly, at least one crack in the interphase region between the polymer matrix and at least one carbon fiber of the plurality of carbon fibers. The methods of repairing comprise subjecting the self-healing carbon fiber composite to a healing cycle. The healing cycle may be selected the group consisting of a temperature cycle, a moisture cycle, a light cycle, and any combinations thereof.

In various aspects, following the healing cycle, the self-healing carbon fiber composite has at least a portion of the micro-cracks closed, and a portion of the initial tensile strength of the self-healing polymer recovered as described above prior to damage. In particular, following a healing cycle, the self-healing interphase region has at least about 60% of an initial tensile strength of the self-healing carbon fiber composite interphase region.

In various aspects, the temperature cycle may include subjecting a self-healing carbon fiber composite to various temperatures over various amounts of time. The required temperature may be supplied internally resulting from the damage itself and/or may be supplied externally. Suitable temperatures include ≥about 16° C., ≥about 18° C., ≥about 20° C., ≥about 25° C., ≥about 30° C., ≥about 35° C., ≥about 40° C., ≥about 45° C., ≥about 50° C., ≥about 55° C., ≥about 60° C., ≥about 65° C., ≥about 70° C., ≥about 75° C., ≥about 80° C., ≥about 85° C., ≥about 90° C., ≥about 95° C., ≥about 100° C., ≥about 105° C., ≥about 110° C., ≥about 115° C. or ≥about 120° C. Ranges expressly disclosed include combinations of any of the above-enumerated values, e.g., about 16° C. to about 120° C., about 18° C. to about 25° C., about 50° C. to about 95° C., etc. In particular, suitable temperatures include about 18° C. to about 25° C., about 50° C. to about 100° C., about 60° C. to about 90° C., or about 60° C. to about 80° C.

Suitable amounts of time in combination with the above temperatures include ≥about 1 hour, ≥about 2 hours, ≥about 3 hours, ≥about 4 hours, ≥about 6 hours, ≥about 12 hours, ≥about 18 hours, ≥about 24 hours, ≥about 30 hours, ≥about 36 hours, ≥about 42 hours, ≥about 48 hours, ≥about 60 hours, ≥about 72 hours, ≥about 84 hours or ≥about 96 hours. Ranges expressly disclosed include combinations of any of the above-enumerated values, e.g., about 1 hour to about 96 hours, about 1 hour to about 4 hours, about 12 hours to about 42 hours, etc. In particular, suitable amounts of time include about 1 hour to about 4 hours, about 18 hours to about 96 hours, about 24 hours to about 72 hours.

In particular, during the temperature cycle, the temperature may be about 18° C. to about 25° C. for about 18 to about 96 hours or about 50° C. to about 90° C. for about 1 to about 24 hours.

In various aspects, the moisture cycle may include introducing water into the self-healing carbon fiber composite, which may include exposing the self-healing carbon fiber composite to liquid or vaporized water (e.g., steam). For example, 95% relative humidity at 30° C. for 12 hours. A moisture level can be in the range of about 50% to about 100% with a temperature range of greater than or equal to room temperature (e.g., 21° C.) to about 130° C.

In various aspects, the light may include exposing the self-healing carbon fiber composite to a light source, e.g., ultraviolet (UV) light. The composites can be exposed to UV light at different temperatures for time periods of up to about 96 hours. In one example, the self-healing carbon fiber composite is exposed to UV light for less than or equal to 1 hour at room temperature.

III. Methods of Manufacturing Carbon Fiber Composites

In another embodiment, methods of manufacturing self-healing carbon fiber composites as described herein are provided. The methods comprise coating a plurality of carbon fibers as described herein with a self-healing polymer layer described above. Optionally, the method may further comprise coating the plurality of carbon fibers with a sizing agent as described above. Coating of the plurality of carbon fibers with the self-healing polymer layer and/or sizing agent may be accomplished via conventional methods, e.g., deposition from a solution of the self-healing polymer and/or sizing agent, deposition of the liquid precursor of the self-healing polymer followed by the curing of the precursor, deposition of the self-healing polymer layer and/or sizing agent onto the carbon fiber surface by electrodeposition, deposition of the self-healing polymer layer and/or sizing agent onto the carbon fiber surface by electropolymerization, plasma polymerization, etc. In particular, the self-healing polymer layer is bonded to the plurality of carbon fibers as an ionic bond, a covalent bond or a hydrogen bond and/or the self-healing polymer layer comprises an alkoxyamine moiety and/or a metal (e.g., Zn) ligand.

Following coating of the self-healing polymer on the plurality of carbon fibers, the carbon fibers may be dispersed in a precursor of a polymer matrix as described above to form a mixture. The mixture formed may then be cured or solidified. The process of forming the composite may include compression molding, injection molding, pultrusion, resin transfer molding, molding of the sheet molding compound, autoclave molding, vacuum bagging, and hand layup, by way of non-limiting example. Such processes can be conducted at room temperature (e.g., 21° C.) to less than or equal to about 150° C. with vacuum or pressure. The carbon fiber present at greater than or equal to about 40% by volume in the composite so that it is more likely to wet the carbon fibers with the liquid resin or polymeric precursor, not dispersing the fibers in the liquid resin.

In particular, the precursor may be a resin that comprises a bisphenol A epoxy resin, a vinyl ester, a polyhydroxyether resin, a bisphenol A based polyester resin, a urethane modified epoxy resin, a nylon epoxy resin, a novolac-based epoxy resin, a polyphenyleneoxide resin, a styrene/maleic anhydride (SMA) resin, an isoprene/SMA resin, a polysulfone resin, a 1,2-polybutadiene resin, a polyurethane resin, and/or a silicone resin. Additionally, the self-healing polymer layer is present between the polymer matrix and at least a portion of the plurality of carbon fibers.

Alternatively, a method for manufacturing the self-healing carbon fiber composites described herein may use carbon fibers premanufactured with a sizing agent. The carbon fibers premanufactured with a sizing agent may be coated with a self-healing polymer layer as described above then dispersed in a polymer matrix as described above followed by curing or solidification.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A self-healing carbon fiber composite comprising:
   a polymer matrix;
   a plurality of carbon fibers dispersed within the polymer matrix; and
   a self-healing polymer layer bonded onto at least a portion of a surface of each of the carbon fibers of the plurality, such that each of the carbon fibers is at least partially coated by a respective self-healing polymer layer, wherein each self-healing polymer layer is individually bonded to the surface of each the carbon fibers by a bond selected from the group consisting of an ionic bond, a covalent bond, and a hydrogen bond, and wherein the self-healing polymer layers are present between the polymer matrix and at least a portion of the surface of the plurality of carbon fibers.

2. The self-healing carbon fiber composite of claim 1, wherein each self-healing polymer layer comprises an alkoxyamine moiety and/or a metal ligand.

3. The self-healing carbon fiber composite of claim 2, wherein the metal is zinc.

4. The self-healing carbon fiber composite of claim 1, wherein each self-healing polymer layer has a thickness of greater than or equal to about 10 nm to less than or equal to about 3000 nm.

5. The self-healing carbon fiber composite of claim 1, wherein each self-healing polymer layer has a first toughness that is less than or equal to a second toughness of the polymer matrix.

6. The self-healing carbon fiber composite of claim 1, wherein a portion of the plurality of carbon fibers each has an average diameter of greater than or equal to about 5 µm to less than or equal to about 15 µm.

7. The self-healing carbon fiber composite of claim 1, wherein the polymer matrix is formed from a resin selected from the group consisting of: a bisphenol A epoxy resin, a vinyl ester resin, a polyhydroxyether resin, a bisphenol A based polyester resin, a urethane modified epoxy resin, a nylon epoxy resin, a novolac-based epoxy resin, a polyphenyleneoxide resin, a styrene/maleic anhydride (SMA) resin, an isoprene/SMA resin, a polysulfone resin, a 1,2-polybutadiene resin, a silicone resin, a polyurethane resin and combinations thereof.

8. The self-healing carbon fiber composite of claim 1, wherein the carbon fiber composite is capable of closing at least about 60% of the initial micro-cracks in the self-healing polymer layer or recovering at least about 60% of an initial tensile strength of the self-healing polymer layer following micro-cracking of the carbon fiber composite.

9. A method of repairing the self-healing carbon fiber composite of claim 1, wherein the carbon fiber composite comprises at least one crack in an interface defined between the polymer matrix and a carbon fiber of the plurality of carbon fibers and the method further comprises subjecting the carbon fiber composite to a healing cycle selected from the group consisted of: a temperature cycle, a moisture cycle, a light cycle, and combinations thereof.

10. The method of claim 9, wherein the temperature cycle comprises subjecting the carbon fiber composite to a temperature of greater than or equal to about 18° C. to less than or equal to about 25° C. for greater than or equal to about 18 to less than or equal to about 96 hours or to a temperature of greater than or equal to about 50° C. to less than or equal to about 90° C. for greater than or equal to about 1 to less than or equal to about 24 hours.

11. The method of claim 9, wherein the moisture cycle comprises introducing water into the carbon fiber composite.

12. The method of claim 9, wherein the light cycle comprises exposing the carbon fiber composite to ultraviolet light.

13. The method of claim 9, wherein following the healing cycle, the self-healing polymer layer has at least about 60% of an initial tensile strength.

14. A component for a vehicle comprising the self-healing carbon fiber composite of claim 1.

15. A method of repairing the component of claim 14, wherein the self-healing carbon fiber composite further comprises at least one crack in an interface between the polymer matrix and the plurality of carbon fibers and the method comprises subjecting the self-healing carbon fiber composite to a healing cycle selected from the group consisting of: a temperature cycle, a moisture cycle, a light cycle, and combinations thereof.

16. A method of manufacturing a self-healing carbon fiber composite, wherein the method comprises:
    coating a plurality of carbon fibers with a self-healing polymer layer that is bonded onto at least a portion of a surface of each of the carbon fibers of the plurality, such that each of the carbon fibers is at least partially coated by a respective self-healing polymer layer, wherein-each self-healing polymer layer is individually bonded to the surface of each of the carbon fibers by a bond selected from the group consisting of an ionic bond, a covalent bond, and a hydrogen bond;
    dispersing the plurality of carbon fibers in a precursor of a polymer matrix; and
    curing the precursor to form the polymer matrix having the plurality of carbon fibers dispersed therein, wherein the self-healing polymer layers are present between the polymer matrix and the plurality of carbon fibers.

17. The method of claim 16 further comprising coating the plurality of carbon fibers with a sizing agent before the coating of the plurality of carbon fibers with the self-healing polymer layer.

18. The method of claim 16, wherein the self-healing polymer layer comprises an alkoxyamine moiety and/or a metal ligand.

19. The method of claim 18, wherein the metal is zinc.

20. The method of claim 19, wherein the precursor is selected from the group consisting of: a bisphenol A epoxy resin, a vinyl ester resin, a polyurethane resin, a polyhydroxyether resin, a bisphenol A based polyester resin, a urethane modified epoxy resin, a nylon epoxy resin, a novolac-based epoxy resin, a polyphenyleneoxide resin, a styrene/maleic anhydride (SMA) resin, an isoprene/SMA resin, a polysulfone resin, a 1,2-polybutadiene resin, a silicone resin, and combinations thereof.

* * * * *